United States Patent

Ito et al.

[11] Patent Number: 5,972,278
[45] Date of Patent: Oct. 26, 1999

[54] METHOD OF FORMING SYNTHETIC RESIN FORMED ARTICLES

[75] Inventors: Keizo Ito; Takashi Kato, both of Ichinomiya; Shoji Sakaida, Gifu-ken; Hikaru Ando, Kasugai, all of Japan

[73] Assignee: Toyoda Gosei Co., Ltd., Nishikasugai-gun, Japan

[21] Appl. No.: 08/019,335

[22] Filed: Feb. 18, 1993

Related U.S. Application Data

[63] Continuation of application No. 07/796,900, Nov. 25, 1991, abandoned, which is a continuation of application No. 07/599,468, Oct. 18, 1990, abandoned.

[30] Foreign Application Priority Data

| Oct. 24, 1989 | [JP] | Japan | 1-276436 |
| Oct. 24, 1989 | [JP] | Japan | 1-276437 |
| Mar. 30, 1990 | [JP] | Japan | 2-085375 |

[51] Int. Cl.$^6$ .......................... B29C 43/18; B29C 45/14; B29C 51/10
[52] U.S. Cl. .......................... 264/510; 264/138; 264/250; 264/259; 264/276; 264/294
[58] Field of Search .......................... 264/510, 250, 264/259, 138, 511, 553, 161, 163, 266, 276, 294, 267, 265

[56] References Cited

U.S. PATENT DOCUMENTS 4,307,058  12/1981  Morello et al. .......................... 264/510

FOREIGN PATENT DOCUMENTS

| 186016 | 12/1984 | European Pat. Off. . | |
| 343245 | 12/1987 | European Pat. Off. . | |
| 333198 | 9/1989 | European Pat. Off. . | |
| 0333198 | 9/1989 | Japan | 264/259 |
| 2206835 | 4/1988 | United Kingdom . | |

*Primary Examiner*—Angela Ortiz
*Attorney, Agent, or Firm*—Pillsbury Madison & Sutro LLP

[57] ABSTRACT

A method of forming a synthetic resin formed article having a double-layer structure of a base portion and a covering portion which covers an outer periphery of the base portion and which has an inwardly curved portion for covering an end portion of the base portion. The method includes the steps of forming a sheet-like material into a predetermined shape by the vacuum forming to obtain a preliminary covering portion; trimming an end portion of the preliminary covering portion obtained in the previous step to obtain the covering portion of the formed article; setting the covering portion of the formed article on one of a pair of dies which constitute a press-type forming die with the curved portion of the covering portion being supported by a slide core located at a forefront position; setting a molten resin which is forming material of the base portion into a gap between the one die and the other die in a state in which the covering portion of the formed article is being set on the one die; clamping the press-type forming die in a state wherein the slide core is in contact with the other die at the forefront position immediately after or in synchronism with the molten resin setting step and causing the molten resin to set to form it; and opening the forming die and then removing the formed article obtained in the clamping step from the press-type forming die.

10 Claims, 9 Drawing Sheets

METHOD OF FORMING SYNTHETIC RESIN FORMED ARTICLES

This is a continuation of application Ser. No. 07/796,900, filed on Nov. 25, 1991, which was abandoned upon the filing hereof; which was a continuation of Ser. No. 07/599,468 filed Oct. 18, 1990, now abandoned.

BACKGROUND OF THE INVENTION

1. Field of the Invention

The present invention relates to a method of forming synthetic resin formed articles, i.e., a method of in-mold forming synthetic resin formed articles. More particularly, the present invention pertains to a method of in-mold forming synthetic resin formed articles having a double-layer structure consisting of a base portion and a covering portion for covering the outer periphery of the base material including the end portion thereof, such as instrument panels, console boxes, undercovers, or glove doors for automobiles.

2. Description of the Prior Art

Japanese Patent Unexamined No. 58-171921 discloses the injection molding method of in-mold molding synthetic resin molded articles having a double-layer structure consisting of a base portion and a covering portion which covers the outer periphery of the base portion and which has an inwardly curved portion for covering an end portion of the base portion.

However, this injection molding method has a disadvantage in that the covering portion is readily broken due to the injection pressure, deteriorating yield of the products. Therefore, there has been a demand for forming the above-described types of formed articles by the press type forming method (such as stamping forming method which is disclosed in, for example, Japanese Patent Unexamined No. 59-7047).

SUMMARY OF THE INVENTION

Figure 15:
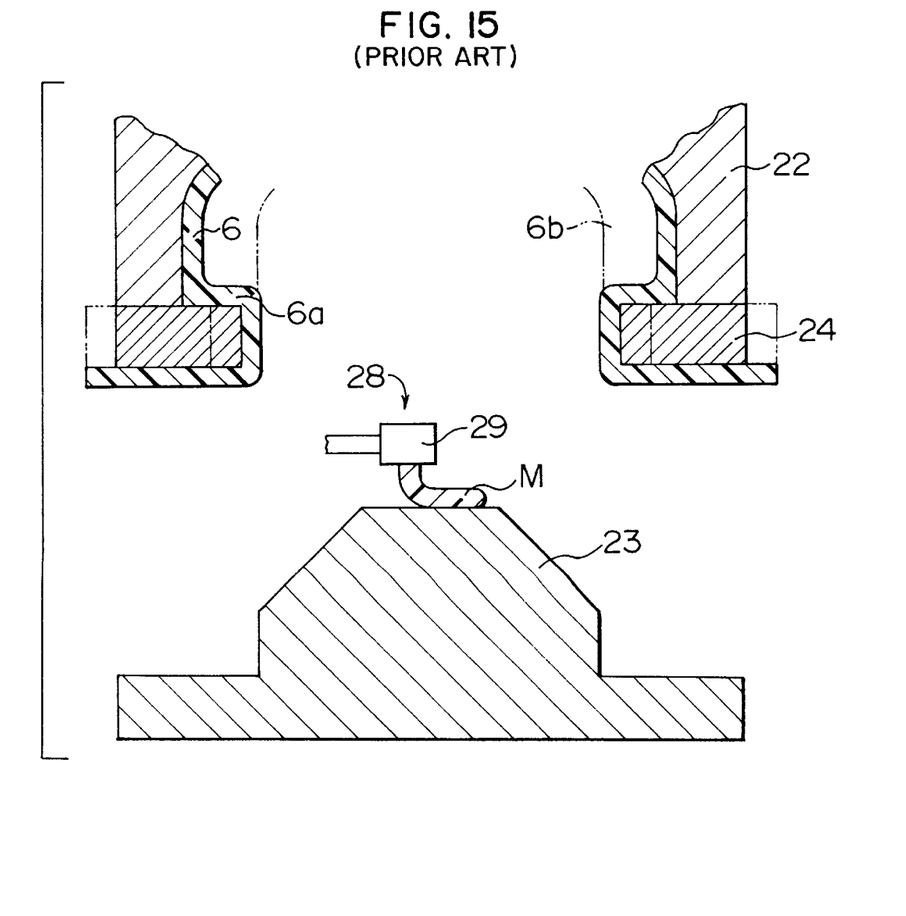
FIG. 15 is a cross-sectional view, showing the problems of a conventional method of forming a synthetic resin formed article having a double-layer structure.

The present invention is made on the basis of such a matter that, in a case where a formed article such as that shown in FIG. 15, in which an end portion 6b of the base portion is covered by a curved portion 6a of the covering portion, is in-mold formed by the conventional press type forming method, it is necessary for clamping to be conducted in a state in which a slide core 24 is set at the forefront (as shown by the solid line in FIG. 15), wherein the following matters are taken into consideration.

That is, if setting of the slide core 24 follows clamping, a molten resin M, which is a forming material of the base portion placed on a lower die 23, leaks from a gap between the slide core 24 during the clamping, thereby allowing burrs to be generated, false products to be generated due to shortage of the volume of the base portion caused by the leakage of the molten resin M, and the working of the forming is made complicated. Also, clamping conducted in a state in which the slide core 24 is set at the forefront causes the curved portion 6a of the covering portion to be readily interfered by the lower die 23, thereby allowing breakage or shifting of the covering portion 6 to be generated and yield of the products to be deteriorated. The covering portion 6 is set on an upper die 22, and the molten resin M is supplied on the lower die 23 from a die 29 of an extruding head 28.

In view of the aforementioned matters, an object of the present invention is to provide a synthetic resin formed article forming method which is capable of forming synthetic resin formed articles without generating burrs or breakage or shifting of the covering portion and which allows yield of the products to be improved.

The present invention provides a method of forming synthetic resin formed articles having a double-layer structure consisting of a base portion and a covering portion which covers an outer periphery of the base portion and which has an inwardly curved portion for covering an end portion of the base portion. The method includes the steps of:

forming a sheet-like material into a predetermined shape by the vacuum forming to obtain a preliminary covering portion;

trimming an end portion of the preliminary covering portion obtained in the previous step to obtain the covering portion of the formed article;

setting the covering portion of the formed article on one of a pair of dies which constitute a press-type forming die with the curved portion of the covering portion being obtained by the trimming step and supported by a slide core located at a forefront position;

setting a molten resin which is a forming material of the base portion into a gap between the one die and the other die in a state in which the covering portion of the formed article is being set on the one die;

clamping the press-type forming die in a state wherein the slide core is in contact with the other die at the forefront position immediately after or at the same time the molten resin setting step and causing the molten resin to set to form it into the formed particle; and opening the press-type forming die and then removing the formed article obtained in the clamping step from the press-type forming die.

In the synthetic resin formed article forming method according to the present invention, the trimming step which is conducted between the forming step and the clamping step involves formation of the covering portion which is to be set on one of the dies which constitute the press-type forming die in a subsequent setting step. The end portion of the covering portion is not interfered by the other die during the clamping which is conducted in a state in which the slide core is located at the forefront position. In consequence, breakage or shifting of the covering portion, caused by the interference of the other die, can be eliminated, thereby enabling manufacture of formed articles which have no wrinkles with an improved yield. Furthermore, clamping is conducted in a state in which the slide core is in contact with the other die at the forefront position, leakage of the molten resin is eliminated, thereby preventing generation of burrs. Furthermore, the trimming process is not the final process but is conducted on the formed covering portion. In consequence, the trimming operation is simplified as compared with that conducted in the conventional method.

DETAILED DESCRIPTION OF THE PREFERRED EMBODIMENTS

A first embodiment of the present invention will be described below with reference to the accompanying drawings.

Figure 9:
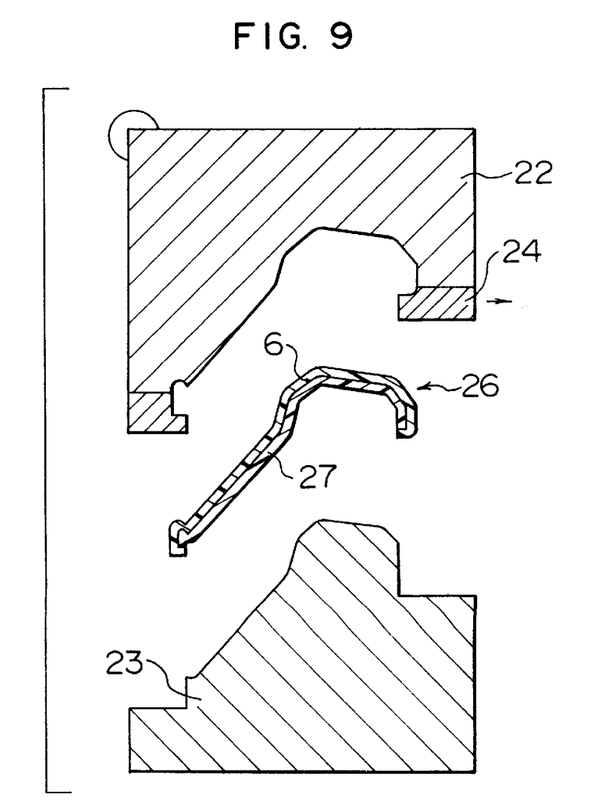
FIG. 9 shows the die-parting process conducted at the end of the stamping in the embodiment of FIG. 1.
Figure 12:
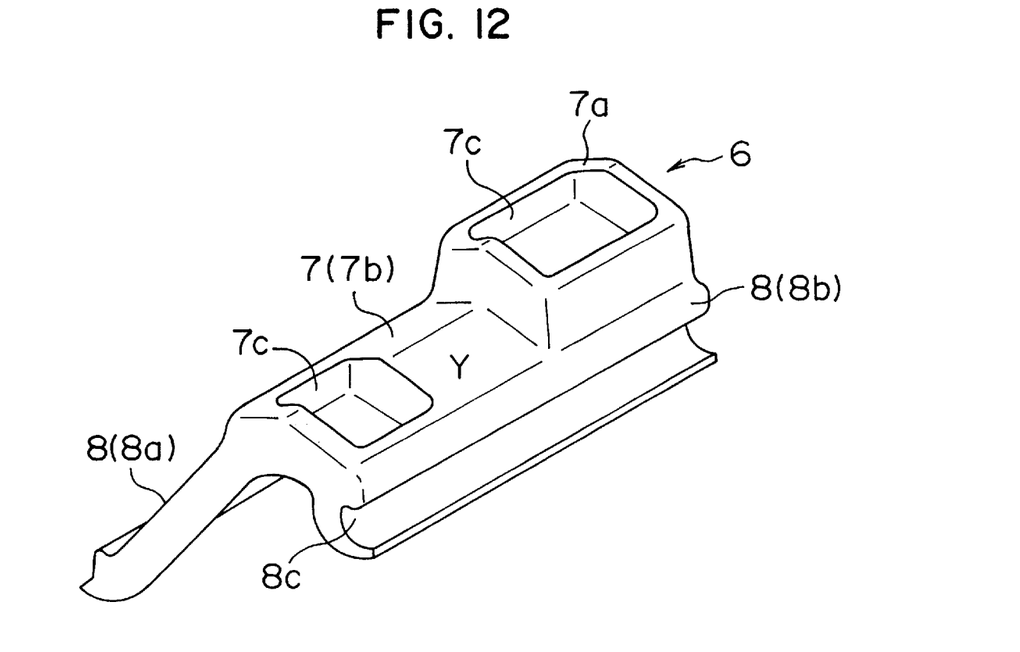
FIG. 12 is a perspective view of the covering portion which is formed in the embodiment of FIG. 1.
Figure 13:
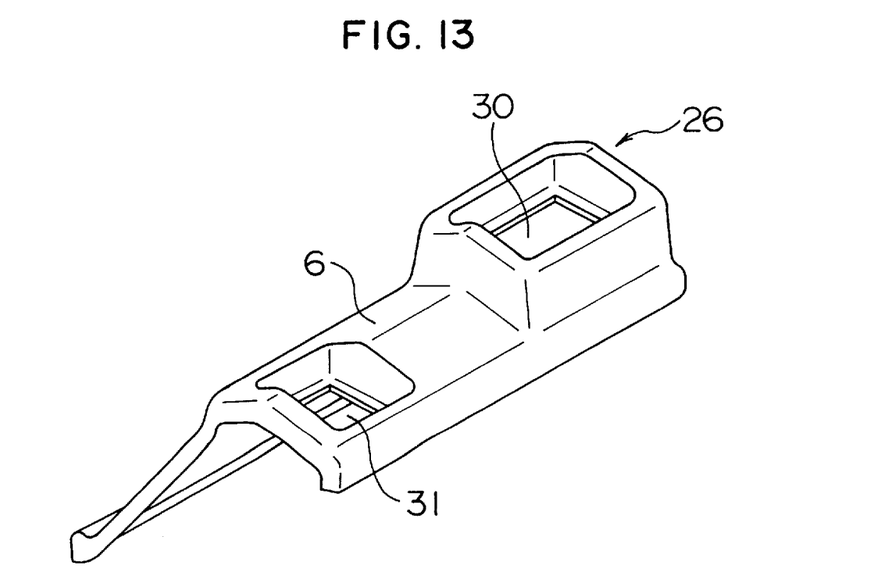
FIG. 13 is a perspective view of a formed article obtained by the stamping in the embodiment of FIG. 1.

A formed article 26 manufactured in this embodiment is an instrument panel for an automobile having a double-layer structure consisting of a base portion 27 and a covering portion 6 whose surface has irregularities, e.g., is crept, and which covers the surface of the base portion 27, as shown in FIGS. 9 and 13. The base portion 27 is formed of polypropylene (PP). The covering portion 6 is manufactured by vacuum forming a sheet-like material 15 shown in FIGS. 6 and 12. The sheet-like material 15 is a composite sheet composed of a foamed layer made of a thermoplastic resin which may be polypropylene foam, and a covering layer made of soft polyvinyl chloride (PVC). The sheet-like material 15 is prepared by cutting this composite sheet laminated by adhesive into predetermined shapes.

Figure 6:
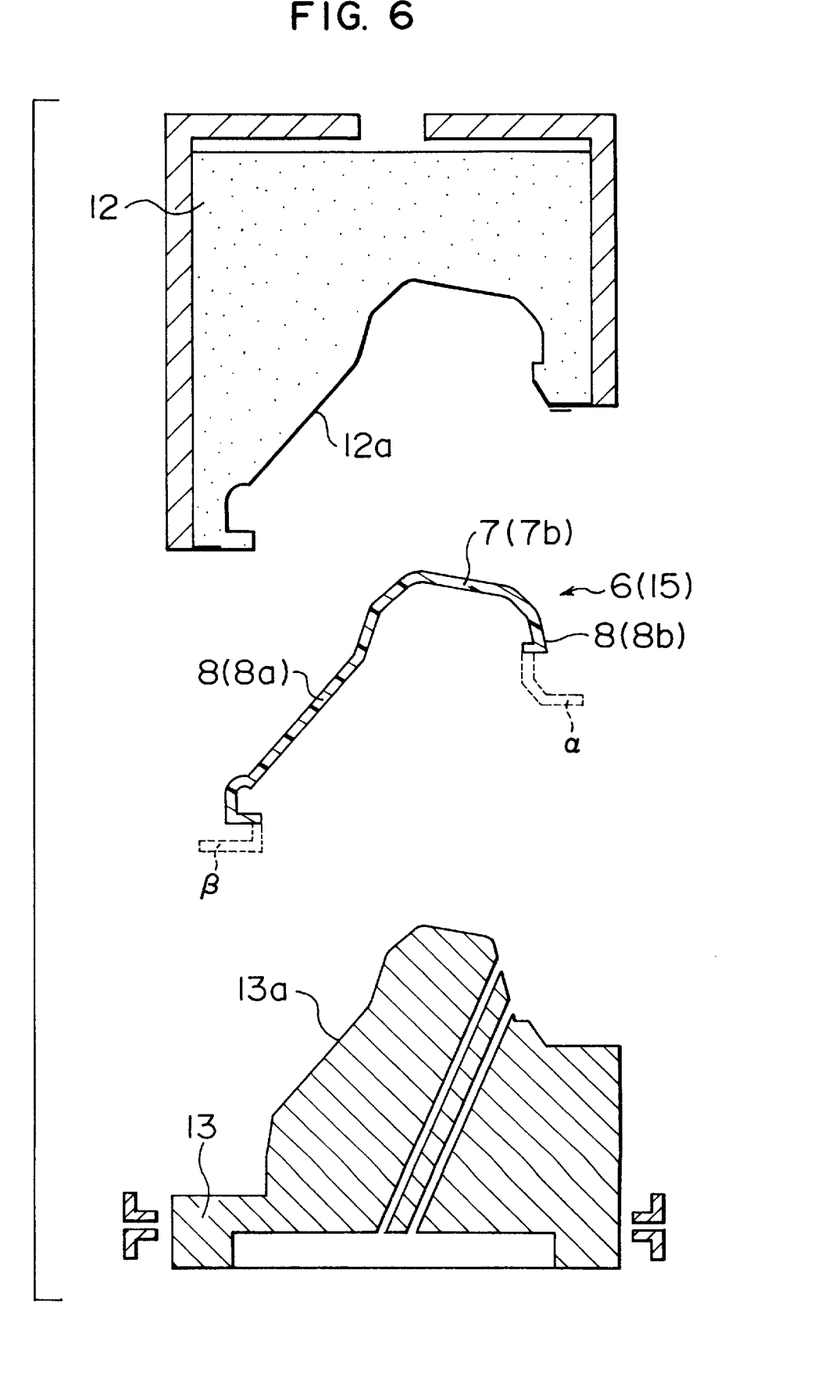
FIG. 6 is a cross-sectional view, showing die parting process conducted for formation of the covering portion in the embodiment of FIG. 1.

As shown in FIGS. 6 and 12, the covering portion 6 has a box-like shape whose depth is large and which is made up of a horizontal wall portion 7 and a verticla wall portion 8 which extends downward from the periphery of the horizontal wall portion 7. The vertical wall portion 8 includes a long portion 8a and a short portion 8b which are positioned in opposed relation. The short portion 8b has an undercut portion 8c. The horizontal wall portion 7 includes an upper stage portion 7a and a lower stage portion 7b each of which has a recessed portion 7c which is to be cut out after the stamping which will be described later.

The manufacturing process of the formed article 26 will now be described.

First, the covering portion 6 is manufactured in advance in the manner described below.

1. Preparation

Figure 2:
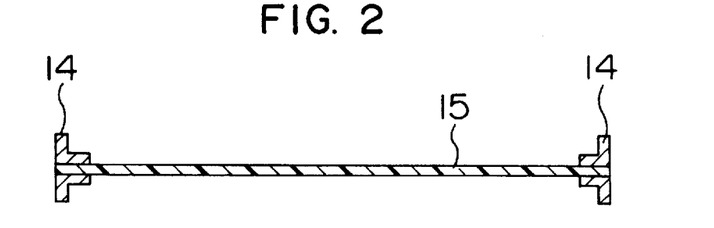
FIG. 2 is a cross-sectional view, showing preparation process conducted for formation of the covering portion in the embodiment of FIG. 1.
Figure 11:
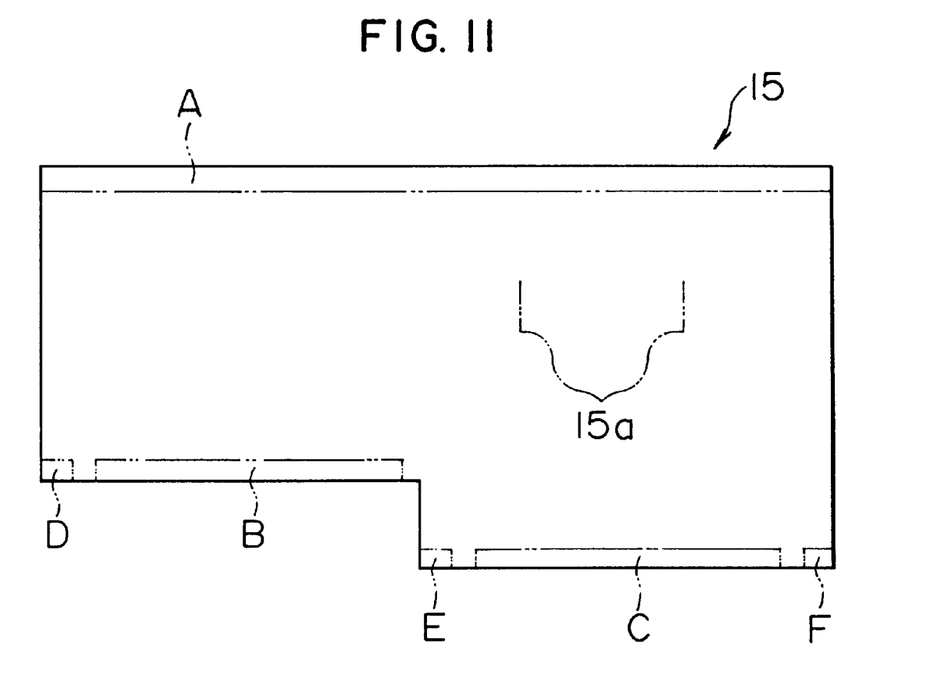
FIG. 11 is a plan view of a sheet-like material used in the embodiment of FIG. 1.

First, the flat sheet-like material 15 such as that shown in FIG. 11, which corresponds to the formed article 6, is prepared, and portions A to F of the peripheral edge thereof are gripped by a clamp 14 (see FIG. 2).

The sheet-like material 15 is prepared by cutting a composite sheet material adhesively laminating PP foam on PVC sheet sheeted by calendering into predetermined shapes. At that time, slits 15a (see FIG. 11) may be formed at positions of the sheet-like material 15 where the recessed portions 7c of the upper stage portion 7a are to be formed later in such a manner that they protrude upward and at the same time are recessed to further reduce elongation of the sheet-like material 15 which will occur during the clamping of a vacuum die 11 which will be described later. The clamp 14 which is used in this process is constructed such that it can hold a plurality of predetermined positions of the peripheral edge of the sheet-like material 15, such that it can release gripping partially, and such that it can shift the gripped portions.

2. Softening

Figure 3:
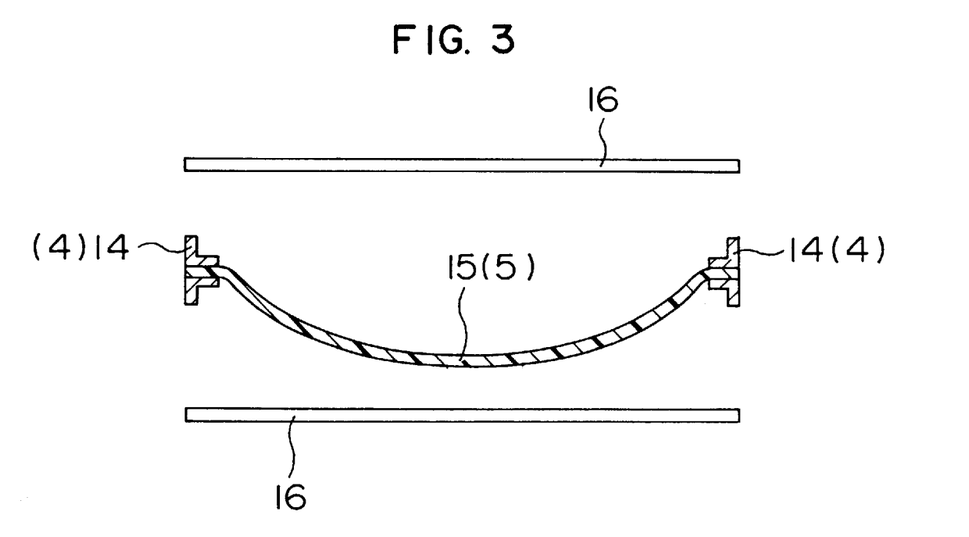
FIG. 3 is a cross-sectional view, showing softening process conducted for formation of the covering portion in the embodiment of FIG. 1.

Thereafter, the sheet-like material 15 is gripped and in that state softened by heating it to a temperature from 160 to 210° C. by means of a ceramic heater 16 (see FIG. 3).

At that time, unlike the conventional case in which the entire periphery of the sheet-like material 15 is gripped by the clamp 14, since the peripheral edge of the sheet-like material 15 is partially gripped by the clamp 14, the portions of the material whose peripheral edge is not gripped, move during the heating thereof. This enables distortion of the sheet-like material 15 which is generated during the calendering to be removed.

3. Setting

Figure 4:
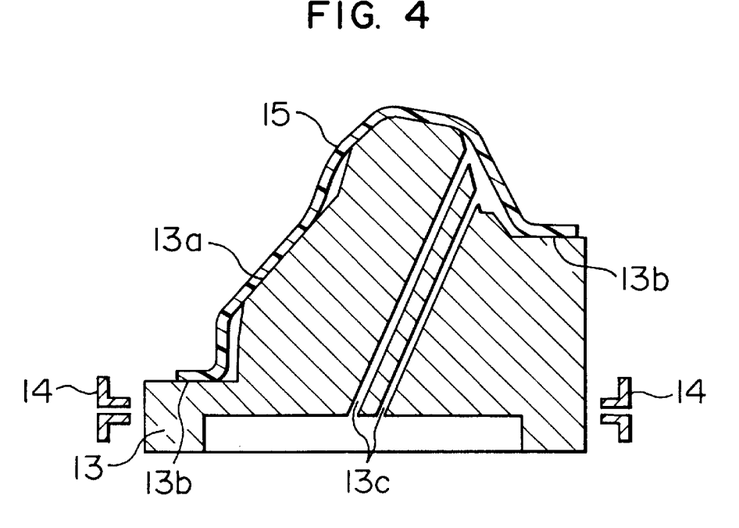
FIG. 4 is a cross-sectional view, showing setting process conducted for formation of the covering portion in the embodiment of FIG. 1.

Thereafter, the softened sheet-like material 15 is placed on a lower die 13 (see FIG. 4) by releasing gripping of the portions A to C of the sheet-like material 15 by the clamp 14, by shifting rightward the clamp which grips the portions D and E and then by shifting leftward the clamp which grips the portion F in FIG. 11.

At that time, since the sheet-like material 15 is placed on the lower die 13 in a state in which it is partially gripped by the clamp 14, the portion of the sheet-like material 15 which stretches is supplemented by the portion thereof whose peripheral edge is not gripped by the clamp and variations in the thickness of the sheet-like material can thus be suppressed.

The peripheral edge of the sheet-like material 15 are partially gripped by the clamp 14 at positions which allow wrinkles of the sheet-like material 15 to be eliminated when the sheet is placed on the lower die 13. The positions are appropriately set in accordance with the shape of the formed article. In the case of a formed article having a shape which does not allow the sheet to be wrinkled readily, the clamp for gripping the peripheral edge of the sheet-like material 15 may be released entirely when the sheet-like material is placed on the lower die.

Figure 1:
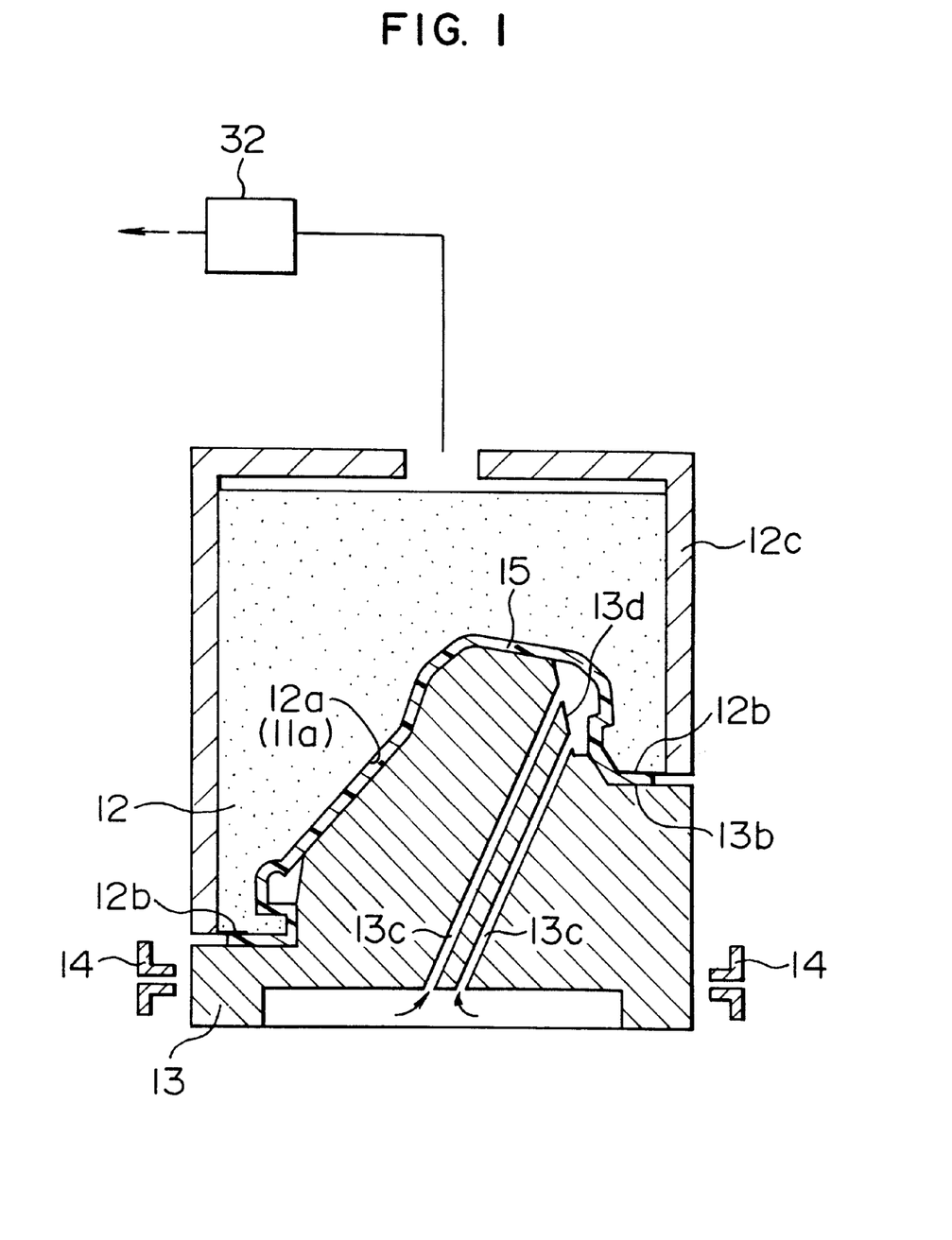
FIG. 1 is a vertical cross-sectional view of a forming die, showing the forming process conducted to prepare a covering portion in a first embodiment of the present invention.

The vacuum forming die 11 used to form the sheet-like material 15 into the formed article 6 consists of an upper die 12, such as a porous ceramic die having a large number of air holes of electroformed mould, and the lower die 13, such as an assist plug die formed by a synthetic resin or aluminum, as shown in FIG. 1.

The upper die 12 has a cavity forming die surface 12a which can form creeping pattern on a surface of the sheet-like material 15 to form it in a predetermined shape. A sealing surface 12b on which a silicone sealant is coated is formed around the cavity forming die surface 12a to seal the gap between the surface 12a and the sheet-like material 15 when it is gripped between the upper die 12 and the lower die 13 during the clamping. A covering member 12c is disposed in such a manner that it surrounds the upper die 12 to hermetically cover it. The interior of the covering member 12c located above the upper die 12 is connected to an evacuation means which is not shown.

The lower die 13 has a cavity forming die surface 13a in a predetermined shape to press the sheet-like material 15 against the cavity forming die surface 12a of the upper die 12. A gripping projection surface 13b is formed around the cavity forming die surface 13a to, together with the sealing surface 12b of the upper die 12, grip the peripheral edge of the sheet-like material 15 during the clamping. The cavity forming die surface 13a also has a recessed portion 13d with forming and parting of the undercut portion 8c of the formed article 6 taken into consideration. Air holes 13c are opened onto the recessed portion 13d to press the sheet-like material 15 against the cavity forming die surface 12a of the upper die 12 due to the air pressure. The air holes 13c are connected to a pressurization means (not shown).

Figure 10:
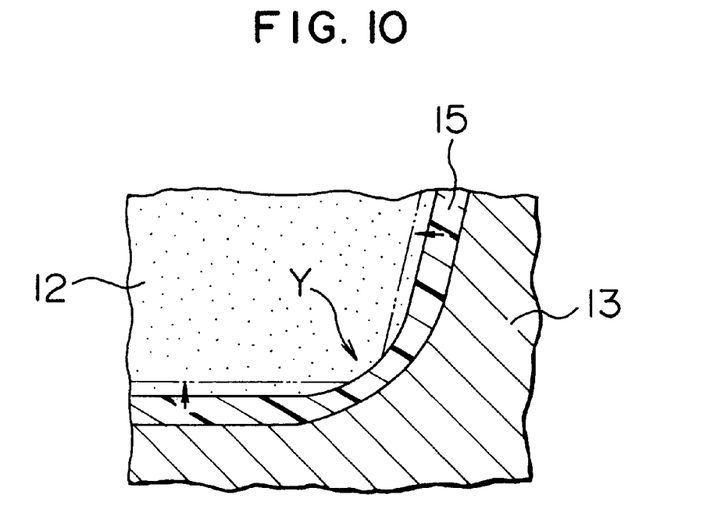
FIG. 10 is a partial cross-sectional view, explaining measures of coping with spring back which occurs in the vicinity of the protruding portion of the formed article during the vacuum formation in the embodiment of FIG. 1.

A cavity 11a should also be designed with compression of the recessed portion Y of the formed article, during clamping taken into consideration. This is necessary to prevent generation of wrinkles of the recessed portion due to the spring back which will occur after formation (see FIG. 10).

4. Clamping

Figure 5:
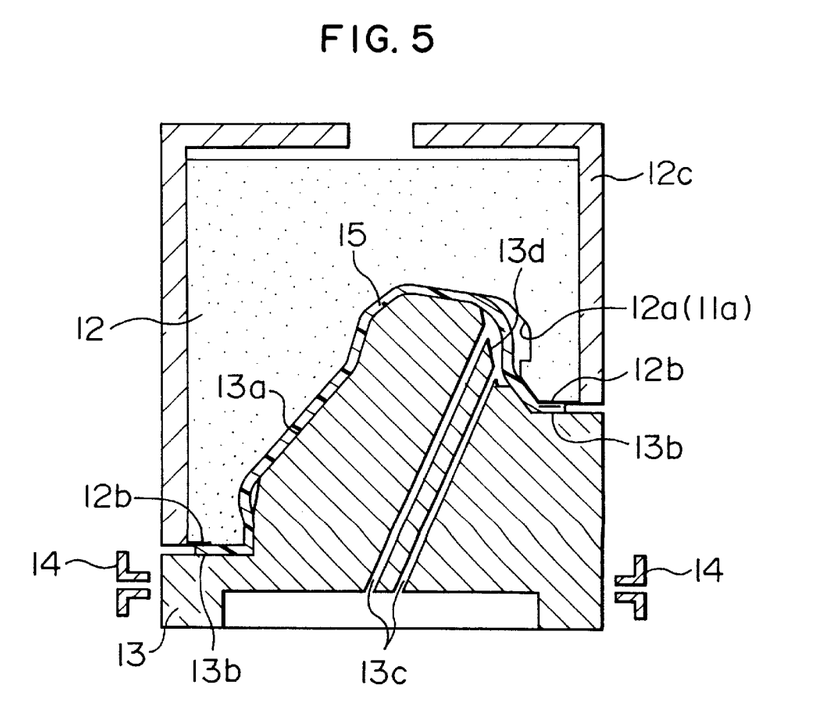
FIG. 5 is a cross-sectional view, showing clamping process conducted for formation of the covering portion in the embodiment of FIG. 1.

Next, the vacuum die 11 is clamped and the overall peripheral edge of the sheet-like material 15 is thereby gripped to be sealed by the sealing surface 12b of the upper die 12 and the gripping surface 13b of the lower die 13 (see FIG. 5). When the die 11 is clamped, the peripheral edge of the sheet-like material 15 is gripped by the upper and lower dies 12 and 13 and the sheet-like material 15 is thereby fixed in position. So, remaining grip of the sheet-like material by the clamp 14 is released.

At the beginning of the clamping, since the peripheral edge of the sheet-like material 15 is partially gripped by the clamp 14, the portion of the sheet-like material 15 which stretches is supplemented by the portion thereof whose peripheral edge is not gripped by the clamp and variations in the thickness of the sheet-like material can thus be suppressed. As a result, non-uniform thickness of the sheet-like material 15 can be restricted as much as possible.

In this process, the foamed layer in the recessed portion Y of the formed article 6 must be compressed. This is achieved by reducing the space between the upper and lower dies corresponding to the recessed portion Y since the foamed layer is in a heated condition.

5. Forming

Subsequently, the sheet-like material 15 is pressed against the cavity forming die surface 12a of the upper die 12 to thereby form creping pattern on the surface of the sheet-like material and formed in a predetermined form by operating the pressurization means (not shown) and the evacuation means, such as a vacuum pump 32, under a pressure at which the PP foam is not compressed (see FIG. 1).

At that time, in the portion for gripping the sheet-like material 15 around the cavity forming die surface 12a of the upper die 12, the sealing surface 12b is formed such that it closes the air hole through which the air is evacuated to form a vacuum. In consequence, leakage of air from the peripheral edge of the sheet-like material 15 is prevented, and forming can thus be conducted without any trouble.

6. Die-Parting

After the sheet-like material 15 has been vacuum formed, the vacuum die is opened and the resultant preliminary formed article 6 is removed from the upper die 12 of the vacuum die (see FIG. 6).

7. Trimming

As shown in FIG. 6, an unnecessary end portion of the preliminary formed article 6 is trimmed off to form the covering portion 6.

In a practice operation, the vertical and horizontal portions are cut off from the preliminary covering portion to form the covering portion 6.

8. Covering Portion Setting

Figure 7:
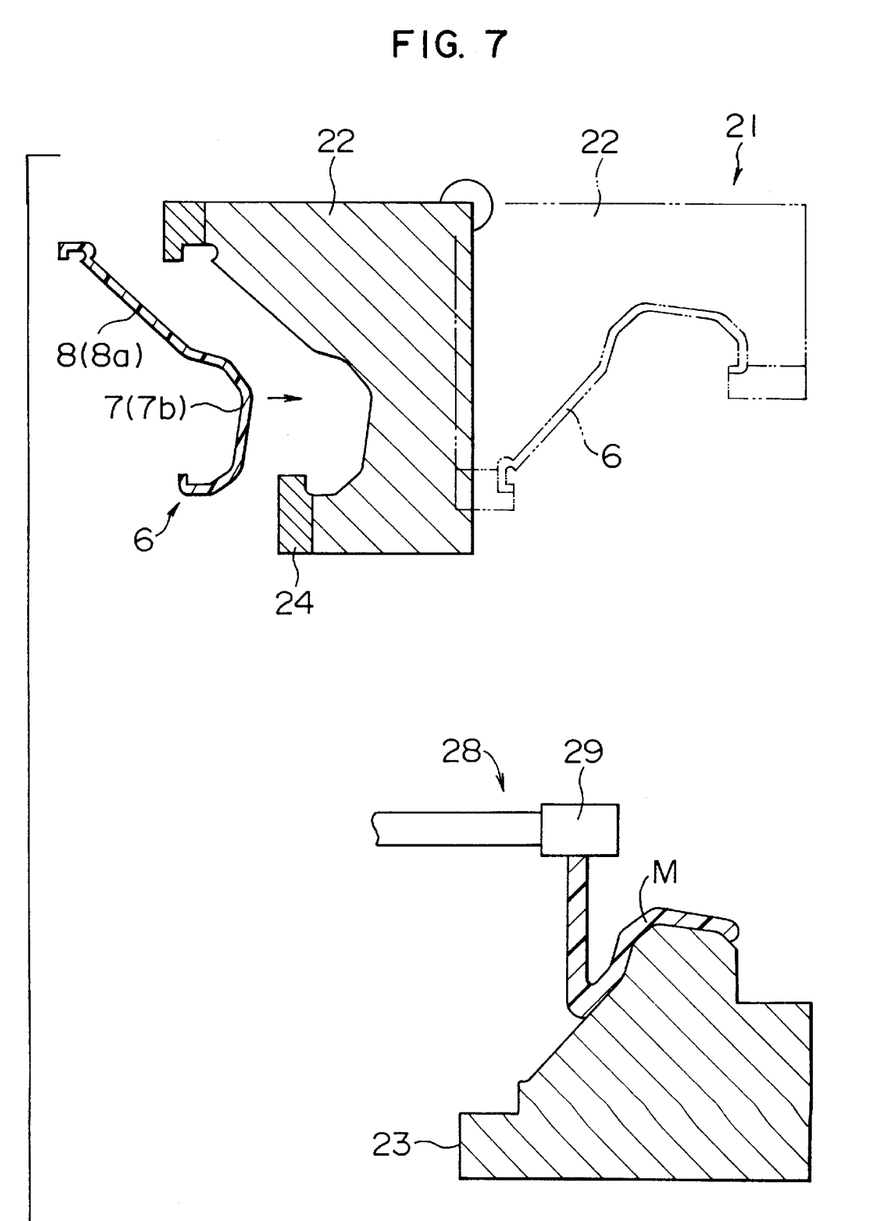
FIG. 7 is a cross-sectional view of a forming die, showing the covering portion setting process and the molten resin setting process which are conducted during the stamping in the embodiment of FIG. 1.

Thereafter, the covering portion 6 is set on an upper die 22 of a stamping die 21 (see FIG. 7). The upper die 22 has at its lower end a slide core 24 which is movable in a horizontal direction. The covering portion 6 is set on the upper die 22 with a curved portion 6a thereof being supported by the upper end surface of the slide core 24 without falling thereof.

At that time, the upper die 22 is pivoted downward beforehand and pivoted back upward after the setting. In this way, setting of the covering portion 6 is facilitated. Further, if the covering portion 6 has irregularities which are at least 3 mm in depth, alignment of the position is facilitated to the upper die 22.

9. Setting of Molten Resin

When the covering portion 6 has been set on the upper die 22, a die 29 of an extruding head 28 which is a part of an extruder is disposed above a lower die 23 of the stamping die 21, and a molten forming material M which is formed of PP is then caused to flow out of the die 29 is placed on the lower die 23 (see FIG. 7).

At that time, to reduce the degree at which the molten forming material M is cooled, the lower die 23 is preferably heated to a temperature from 40 to 100° C.

10. Clamping

Figure 8:
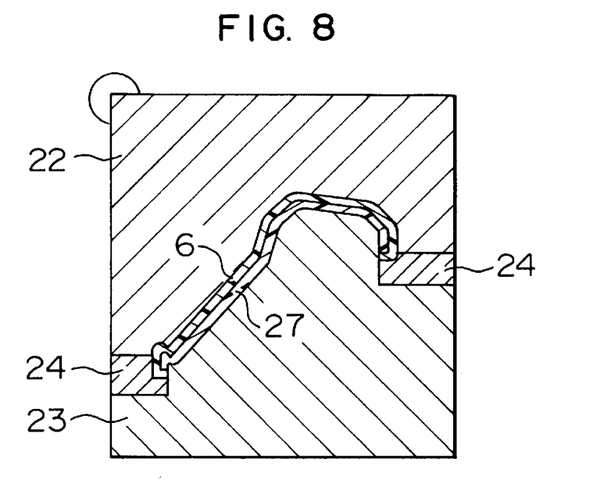
FIG. 8 is a cross-sectional view, showing the clamping process conducted during stamping in the embodiment of FIG. 1.

After the molten forming material M has been placed on the lower die 23 with the covering portion 6 being set on the upper die 22, clamping is conducted by moving the upper die 22 downward (at that time, the clamping pressure is between 50 to 150 ton), and the forming material M is then cooled to cause it to set by adjusting the temperature of the stamping die 21 (see FIG. 8).

At that time, since the forming material M made of PP is the same in quality as that of the backside of the covering portion 6 and located on the lower die 23 of the stamping die 21 in a melted state, the PP foam on the backside of the covering portion 6 is melted due to the heat of the forming material M, thereby allowing the covering portion 6 to be adhered to the base portion 27 without the use of an adhesive. Furthermore, since the forming material M sets and is formed into a predetermined shape by means of the stamping die 21, the use of a base material 27 which is conventionally formed beforehand is not necessary. During the clamping, the foam layer of the covering portion 6 is compressed by the pressure of the forming material M.

To prevent shifting of the covering portion 6 during the clamping, a pin (not shown) engaged with the covering portion 6 may be inserted into each of holes formed in the portions of the covering portion 6 which have the possibility of being shifted from the upper die 22 or lower die 23 (see FIGS. 7, 8 and 12).

During the clamping, the stamping die 21 is moved in a state wherein the lower die 23 is in contact with the slide core 24 located at the forefront. In consequence, leakage of a molten resin 20 from a gap between the lower die 23 and the slide core 24 and, hence, formation of burrs is avoided. Furthermore, as shown in FIGS. 8 and 9, the curved portion of the covering portion 6 is rarely interfered by the lower die 23 during the movement of the die 21. In consequence, breakage or shift of the covering portion 6, caused by the interference thereof by the lower die 23 in a conventional method, can be eliminated.

11. Die Parting

After the forming material M has set, the stamping die 21 is opened while the slide core 24 is being moved, and the formed article 26 is removed from the die. Thereafter, the end portion of the article 26 is treated such that trimming of the peripheral edge thereof and curving of the covering portion 6 are conducted (see FIG. 9).

At that time, the foam layer compressed during the clamping is restored to its original shape. Generation of wrinkles of the Y portion of the covering portion 6, shown in FIG. 10, which would be caused by the presence of the foam layer, is avoided due to the compression of the foam layer on the Y portion.

12. Hole Formation

Thereafter, holes 30 and 31 are formed by cutting open the recessed portions 7c of the covering portion 6 by means of a die cutter or the like, as shown in FIG. 13. The holes 30 and 31 can receive instruments or the like. Thus, an instrument panel 1, which is a synthetic resin formed article 26 having a double-layer structure consisting of the covering portion 6 and the base portion 27, is obtained.

Figure 14:
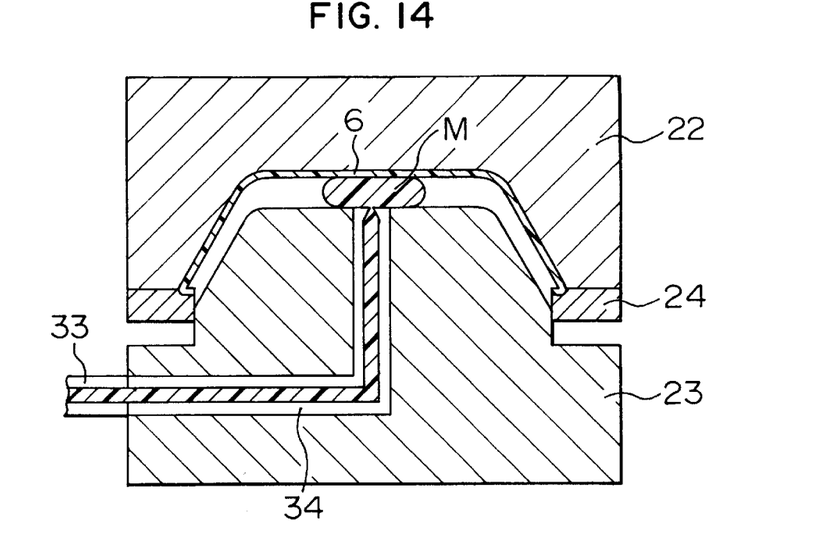
FIG. 14 is a cross-sectional view of an essential process of another embodiment according to the present invention.

FIG. 14 shows the essential process of the in-mold forming method by so-called SPM method, showing a second embodiment of the present invention.

The process shown in FIG. 14 corresponds to the molten resin setting process and the clamping process in the above-described stamping forming method.

The process shown in FIG. 14 is characterized by synchronization of the clamping of the die and the molten resin setting. Setting of the molten resin M is effected such that the molten resin M is caused to flow out from an injection nozzle 33 and then passed through a hot runner 34 formed in the lower die 23 into a cavity formed by the die which is in the midst of being clamped. Other processes are the same as those in the above-described first embodiment, description being therefore omitted.

In this embodiment, the same effect as that obtained in the first embodiment can be obtained.

What is claimed is:

1. A method of forming a synthetic resin formed article having a double-layer structure consisting of a base portion and a covering portion which covers an outer periphery of said base portion and which has an inwardly curved portion for covering an end portion of said base portion, said method comprising the steps of:

forming a sheet material into a predetermined shape by vacuum forming utilizing a vacuum forming die apparatus to obtain a preliminary covering portion;

trimming an end portion of said preliminary covering portion obtained in the forming step to obtain said covering portion of said formed article, said covering portion being formed via vacuum forming prior to formation of the base portion;

setting said covering portion of said formed article on one of a first and second dies which constitute a press forming die with said curved portion of said covering portion being supported by a slide core located at a forefront position;

setting a molten resin which is a forming material of said base portion into a gap between said first die and said second die in a state in which said covering portion of said formed article is being set on said first die;

clamping said press forming die in a state wherein said slide core is in contact with said second die at the forefront position and causing said molten resin to set, thereby forming said resin, the contact between the second die and the slide cores preventing leakage of molten resin and thus avoiding the formation of burrs;

compressing said covering portion so as to join said covering portion with said formed resin; and opening said forming die and then removing the formed article obtained in said clamping step from said press forming die.

2. A method of forming a formed article according to claim 1, wherein said covering portion setting step includes setting of said covering portion on one of die surfaces, and wherein said molten resin setting step includes extrusion of said molten resin onto the other die surface from an extruder.

3. A method of forming a formed article according to claim 1, wherein said covering portion setting step includes setting of said covering portion on one of die surfaces, and wherein said molten resin setting step includes injection of said molten resin from said other die in a state wherein said dies are disposed close to each other in a half-clamped state.

4. A method of forming a formed article having a double-layer structure consisting of a base portion and a covering portion, which covers an outer periphery of said base portion, said method comprising the steps of:

forming a sheet material, made of a thermoplastic resin and having a surface layer and a foam layer, into a predetermined shape by vacuum forming to obtain a preliminary covering portion using a two-part die, one part of which is connected to an evacuation means, said sheet material being heated, said foam layer located at a corner in said two-part die being compressed thus causing said foam layer to be eliminated via action of said two-part die, said covering portion being formed prior to forming said base portion;

setting said covering portion of said formed article obtained in the forming step on one of a first and second dies which constitute a press forming die;

setting a molten resin which is a forming material of said base portion into a gap between said first die and said second die in a state in which said covering portion of said formed article is being set on said first die;

clamping said press forming die and causing said molten resin to set in a gap between said covering portion and said second die to form said resin and said covering portion into said formed article and preventing leakage of said molten resin from said two-part die and thus avoiding the formation of burrs on said formed article due to contact between said second die and a slide core member; and opening said press forming die and then removing the formed article obtained in said clamping step from said press forming die.

5. A method of forming a formed article having a double-layer structure consisting of a base portion and a covering portion that covers an outer periphery of said base portion and which has an inwardly curved portion for covering an end portion of the base portion, said method comprising the steps of:

forming a sheet material, made of a thermoplastic resin and having a surface layer and a foam layer, into a predetermined shape by vacuum forming to obtain a preliminary covering portion using a two-part die, one part of which is connected to an evacuation means, said sheet material being heated, said foam layer located at a corner in said two-part die being compressed and thereby eliminated by said two-part die;

trimming an end portion of said preliminary covering portion obtained in the forming step to obtain said covering portion of said formed article, said covering portion being obtained prior to formation of said base portion;

setting said covering portion of said formed article on one of a first and second dies which constitute a press forming die with said curved portion of said covering portion being supported by a slide core located at a forefront position;

setting a molten resin which is a forming material of said base portion into a gap between said first die and said second die in a state in which said covering portion of said formed article is being set on said first die;

clamping said press forming die in a state wherein said slide core is in contact with said second die at the forefront position and causing said molten resin to set in a gap between said covering portion and said other die to form it into said formed article, said contact between said slide core and said second die preventing leakage of said molten resin and thus avoiding the formation of burrs; and opening said press forming die and then removing the formed article obtained in said clamping step from said press forming die.

6. A method of forming a formed article according to claim 4, wherein said covering portion setting step includes setting of said covering portion on one of die surfaces, and wherein said molten resin setting step includes extrusion of said molten resin onto the other die surface from an extruder.

7. A method of forming a formed article according to claim 4, wherein said covering portion setting step includes setting of said covering portion on one of die surfaces, and wherein said molten resin setting step includes injection of said molten resin from said other die in a state wherein said dies are disposed close to each other in a half-clamped state.

8. A method of forming a formed article according to claim 1, wherein said forming step includes the steps of:

softening said sheet material by heating it in a state wherein a peripheral edge thereof is being gripped by a clamp;

setting the softened sheet material on a lower die of said vacuum forming die which consists of an upper die and said lower die by removing part or all of said clamp which grips the peripheral edge of said sheet material; and clamping said vacuum forming die while sealing it by gripping the overall periphery of said sheet material by means of said upper and lower dies.

9. A method of forming a formed article according to claim 8, wherein said vacuum forming die comprises a porous die in which air holes located on the peripheral edge thereof are closed, and wherein said setting step includes a step of setting an edge of said sheet material at the portion of said vacuum forming die whose air holes are closed.

10. A method as claimed in claim 1, wherein said compressing step includes compressing a foam layer of said covering portion to join said covering layer to said formed resin.

* * * * *